(12) United States Patent
Buchko

(10) Patent No.: US 7,644,568 B2
(45) Date of Patent: Jan. 12, 2010

(54) SERRATED EDGE BED KNIFE

(75) Inventor: Jeffrey Buchko, Clover, SC (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 12/122,189

(22) Filed: May 16, 2008

(65) Prior Publication Data
US 2009/0282798 A1 Nov. 19, 2009

(51) Int. Cl.
*A01D 34/53* (2006.01)

(52) U.S. Cl. ...................................................... 56/249

(58) Field of Classification Search ................... 56/249, 56/249.5, 250, 294, DIG. 17, DIG. 20, 20, 56/255, 295
See application file for complete search history.

(56) References Cited

U.S. PATENT DOCUMENTS

| | | | |
|---|---|---|---|
| 2,458,200 A * | 1/1949 | Renfroe et al. ............... | 56/17.6 |
| 2,528,625 A | 11/1950 | Voytershark | |
| 3,337,100 A | 8/1967 | Berning | |
| 3,350,045 A | 10/1967 | Mayers | |
| 3,759,022 A | 9/1973 | Snyder et al. | |
| 3,782,166 A | 1/1974 | Whistler, Jr. et al. | |
| 4,195,542 A | 4/1980 | Zimmer | |
| 4,233,873 A | 11/1980 | Jessen | |
| 4,719,743 A | 1/1988 | Bokon | |
| 5,291,724 A | 3/1994 | Cotton | |
| 5,379,671 A | 1/1995 | Kang | |
| 5,477,666 A | 12/1995 | Cotton | |
| 5,979,150 A | 11/1999 | Klingler | |
| 5,979,152 A * | 11/1999 | McCredie ..................... | 56/298 |
| 6,044,637 A | 4/2000 | Thier et al. | |
| 6,112,631 A * | 9/2000 | VanAlstine ................... | 83/589 |
| 6,318,059 B1 | 11/2001 | Cotton | |
| 6,510,681 B2 * | 1/2003 | Yang et al. ..................... | 56/298 |
| 6,889,491 B2 | 5/2005 | Buchko et al. | |
| 7,104,883 B2 * | 9/2006 | Dow ........................... | 460/112 |
| 7,124,567 B1 * | 10/2006 | Adamson et al. .............. | 56/296 |
| 2002/0195204 A1 * | 12/2002 | Huang .......................... | 156/577 |
| 2004/0158995 A1 * | 8/2004 | Dunn-Rankin ................ | 30/355 |
| 2004/0194583 A1 * | 10/2004 | Sapienza ........................ | 81/45 |
| 2005/0103082 A1 * | 5/2005 | Farfor ........................... | 72/331 |
| 2005/0166567 A1 | 8/2005 | Buchko | |
| 2006/0075865 A1 * | 4/2006 | Floding et al. ................ | 83/469 |
| 2007/0137161 A1 | 6/2007 | Mahan et al. | |

* cited by examiner

*Primary Examiner*—Árpád Fábián-Kovács
(74) *Attorney, Agent, or Firm*—Harness, Dickey & Pierce, P.L.C.

(57) ABSTRACT

A bed knife for a mower includes a cutting implement for cutting a material. The bed knife includes a mounting portion that mounts to the mower, and a cutting area at which the cutting implement cooperates with the bed knife to cut the material. The bed knife further includes a serrated portion including a plurality of teeth.

18 Claims, 5 Drawing Sheets

SERRATED EDGE BED KNIFE

FIELD

The present disclosure relates to a bed knife of a mower and, more particularly, relates to a serrated edge bed knife for a mower.

BACKGROUND

The statements in this section merely provide background information related to the present disclosure and may not constitute prior art.

Groundskeeping mowers can be used for cutting materials, such as grass, weeds, and other turf. Mowers can include a variety of cutting implements, such as a cutting reel, that rotate during operation. These mowers also typically include a bed knife that is disposed adjacent the cutting reel. The bed knife is typically a generally flat bar with a smooth leading edge. As the mower moves over uncut grass in a cutting direction, the leading edge supports the grass while the cutting reel cuts or shears the grass against a cutting area of the bed knife.

In certain conditions, the bed knife may not adequately agitate and/or support the grass, thereby leaving the turf uncut. For instance, compacted grass may not stand up as the mower passes in order to be cut between the cutting reel and the bed knife. Furthermore, the uncut grass can fall away from the leading edge of the bed knife before it is cut. Accordingly, the grass may be unevenly cut, which is undesirable.

SUMMARY

A bed knife is disclosed for a mower that includes a cutting implement for cutting a material. The bed knife includes a mounting portion that mounts to the mower, and a cutting area at which the cutting implement cooperates with the bed knife to cut the material. The bed knife further includes a serrated portion including a plurality of teeth.

In another aspect, a mower for cutting a material is disclosed. The mower includes a cutting implement, a mounting member, and a bed knife. The bed knife includes a mounting portion that mounts to the mounting member, and a cutting area at which the cutting implement cooperates with the bed knife to cut the material. The bed knife further includes a serrated portion including a plurality of teeth.

Additionally, a walking mower for cutting a material is disclosed. The mower includes a cutting implement, a mounting member, and a bed knife. The bed knife includes a mounting portion that mounts to the mounting member, and a cutting area at which the cutting implement cooperates with the bed knife to cut the material. The bed knife further includes a serrated portion including a plurality of teeth.

Furthermore, a riding mower for cutting a material is disclosed. The mower includes a cutting implement, a mounting member, and a bed knife. The bed knife includes a mounting portion that mounts to the mounting member, and a cutting area at which the cutting implement cooperates with the bed knife to cut the material. The bed knife further includes a serrated portion including a plurality of teeth.

In still another aspect, a method of configuring a mower with a cutting implement that cuts a material comprising is disclosed. The method includes adapting a bed knife for cutting the material. The bed knife includes a mounting portion that mounts to a mounting member of the mower. The bed knife also includes a cutting area at which the cutting implement cooperates with the bed knife to cut the material. Additionally, the bed knife includes a serrated portion including a plurality of teeth. The method further includes mounting the bed knife to the mower.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
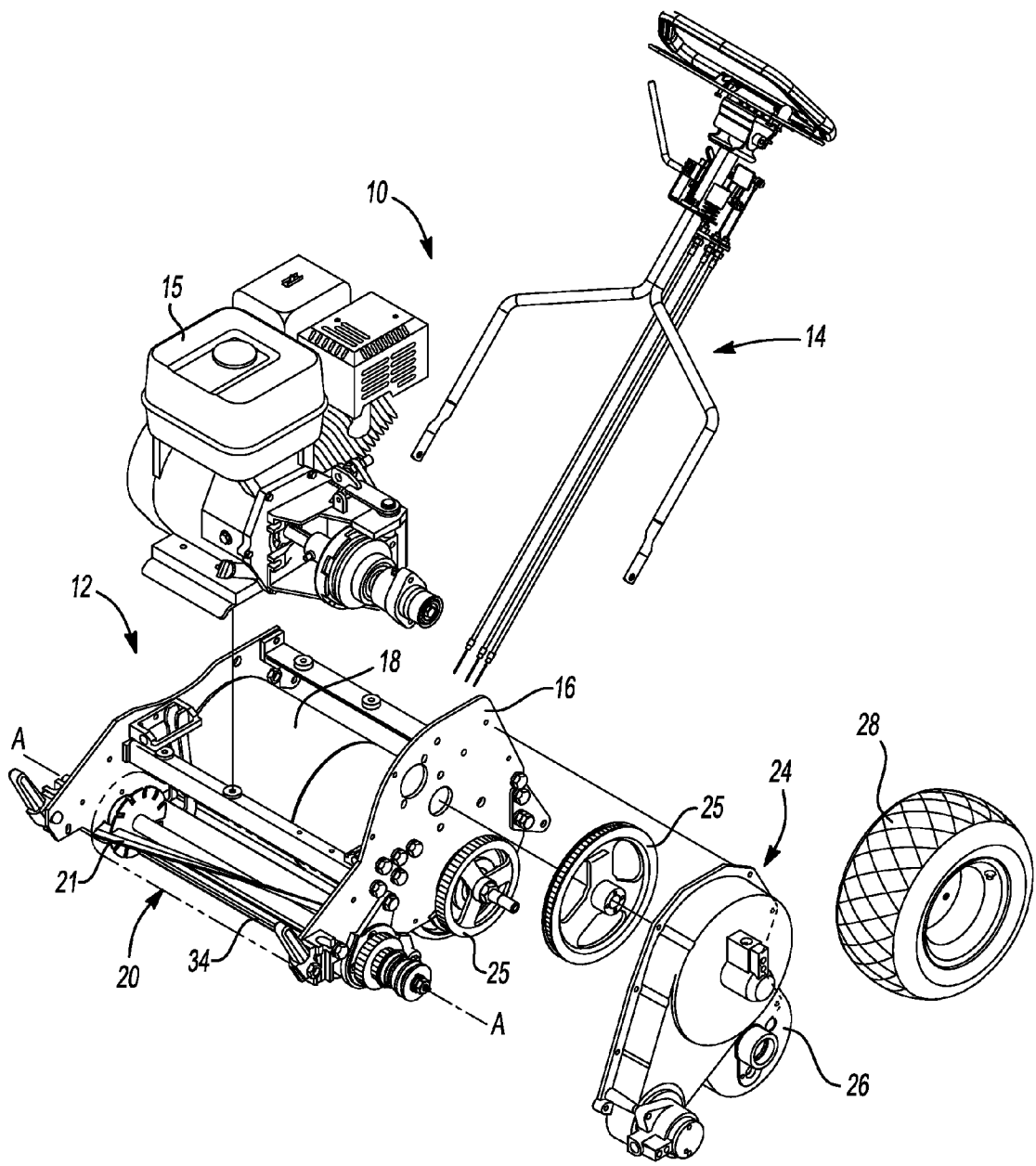
FIG. 1 is a perspective view of a mower according to various embodiments of the present disclosure.

The following description is merely exemplary in nature and is not intended to limit the present disclosure, application, or uses. It should be understood that throughout the drawings, corresponding reference numerals indicate like or corresponding parts and features.

FIG. 1 shows a mower 10 constructed in accordance with various embodiments of the present disclosure. The mower 10 is shown as a walk-behind mower; however, the mower 10 can be of any variety of mowers, including a walking or riding mower and powered in any of a variety of configurations. The mower 10 includes a cutting unit 12 which comprises a power source or engine 15 coupled to a frame 16, and a handle 14 coupled to the frame 16. A traction roller 18 is rotatably coupled to the frame 16 and is drivingly connected to the engine 15.

The cutting unit 12 can further include a cutting implement 20. In some embodiments, the cutting implement 20 is a cutting reel 21 that is rotatably coupled to the frame 16. The cutting reel 21 rotates about a rotation axis A. The cutting reel 21 can be drivingly rotated by the engine 15, or the cutting reel 21 can be directly or indirectly drivingly rotated by an independent motor (not shown), such as an electric or hydraulic motor.

In various embodiments, the mower 10 also includes a transmission 24 having a plurality of gears or sprockets 25 selectively transferring rotational output torque of the engine 15 to the traction roller 18. The transmission 24 includes a clutch 26 operatively disposed between the engine 15 and the transmission 24. The clutch 26 operates in an engaged and disengaged mode for selectively transferring power from the engine 15 to the traction roller 18. A plurality of wheels 28 are coupled to the traction roller 18 and are also selectively driven by the engine 15 to provide motor force for translating the mower 10, typically during a transportation mode of operation. Accordingly, the wheels 28 can translate the mower 10 in a cutting direction C, and the cutting reel 21 can cut grass, weeds, or other turf materials lying ahead of the mower 10 in the cutting direction C.

Figure 3:
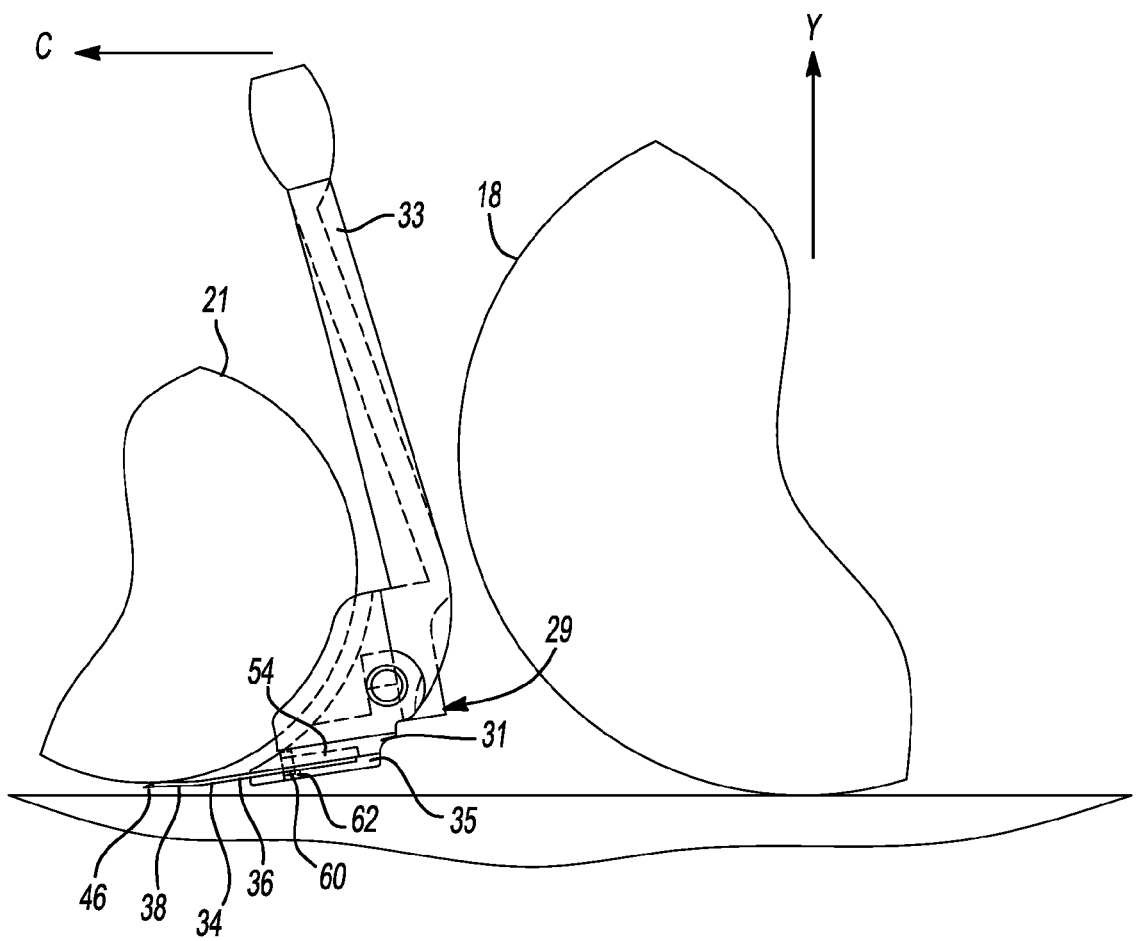
FIG. 3 is a side view of the mower of FIG. 1.

As shown in FIG. 3, the mower 10 also includes a mounting member 29. The mounting member 29 can include a bed bar 31 and an arm 33, which couples the bed bar 31 to the frame 16. The mounting member 29 additionally includes a backing plate 35. The bed bar 31 and the backing plate 35 are substantially flat and extend generally along the axis A. As shown, the bed bar 31 and the backing plate 35 are disposed substantially under the cutting reel 21. Furthermore, the cutting reel 21 is positioned forward of the bed bar 31 and the backing plate 35 relative to a cutting direction C.

Figure 2A:
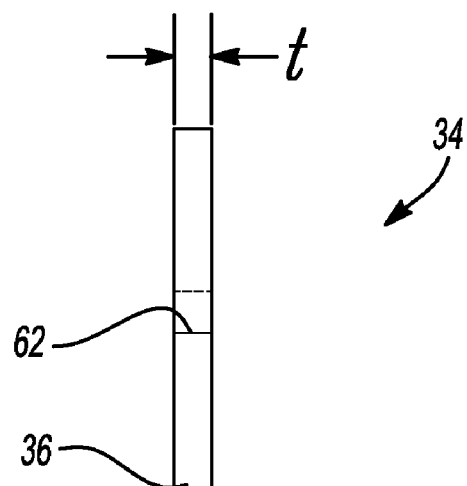
FIG. 2A is an end view of a bed knife for the mower of FIG. 1.
Figure 2A:
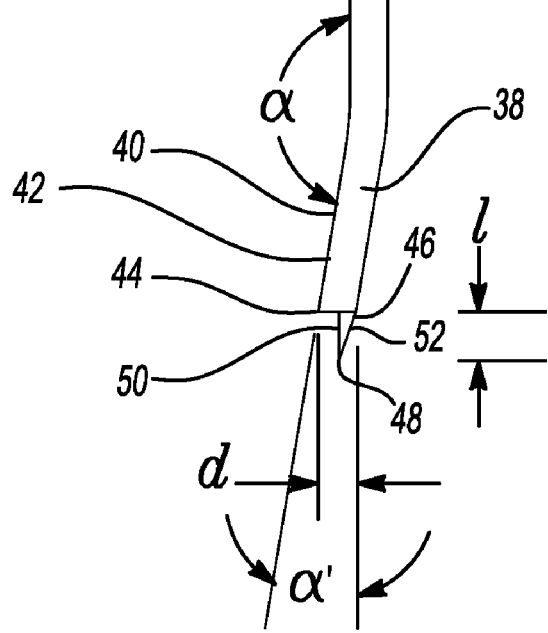
Figure 2B:
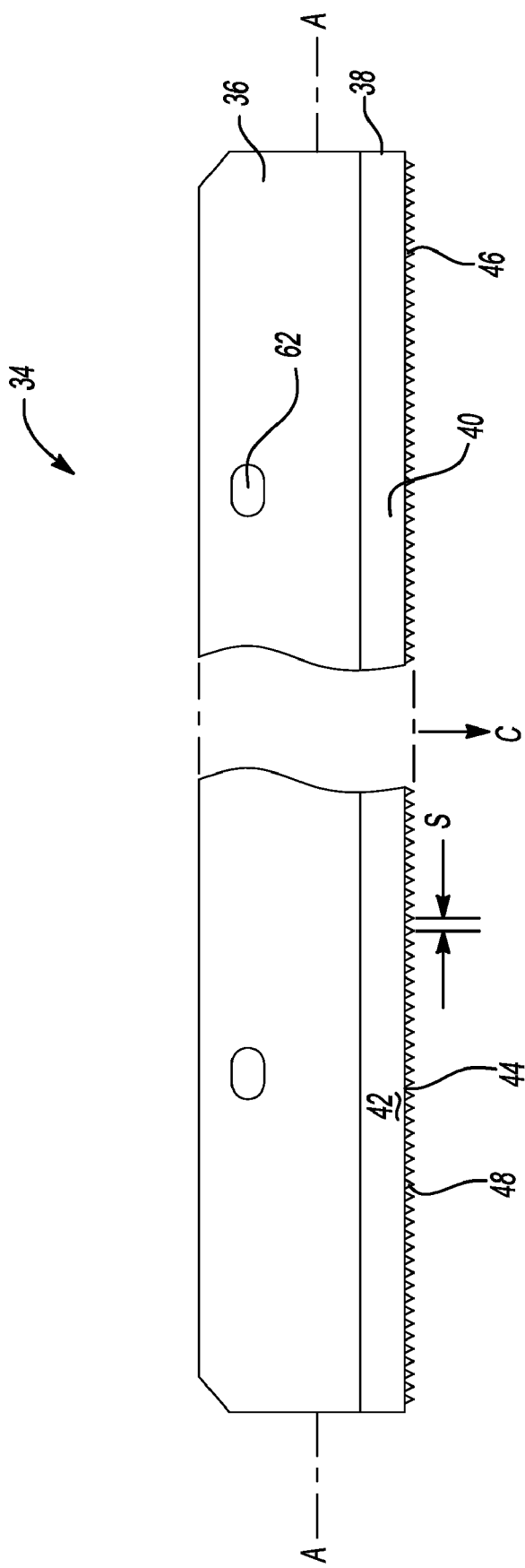
FIG. 2B is a top view of the bed knife of FIG. 2A.

Moreover, the mower 10 includes a bed knife 34, shown in greater detail in FIGS. 2A and 2B. According to some embodiments, the bed knife 34 can be a generally flat, elongate bar. In various embodiments, the bed knife 34 includes a mounting portion 36, a cutting portion 38 that defines a cutting area 40, and a cutting surface 42 on a top face of the cutting area 40. The cutting portion 38 is disposed forward of the mounting portion 36 relative to the cutting direction C. Furthermore, the cutting surface 42 includes a cutting edge 44 at a forward, top terminal end of the cutting surface 42. In addition, the mounting portion 36 and the cutting portion 38 are substantially equal in thickness, t. In various embodiments, the mounting portion 36 and the cutting portion 38 are each planar members. Moreover, in some embodiments, the cutting portion 38 is disposed at a positive angle α (e.g., an obtuse angle) relative to the mounting portion 36.

As will be described, the cutting reel 21 cuts against the cutting surface 42 of the bed knife 34 as the cutting reel 21 rotates. More specifically, as the mower 10 moves in the cutting direction C, grass and other turf becomes disposed between the cutting reel 21 and the cutting surface 42 of the bed knife 34, and the cutting reel 21 and cutting surface 42 cooperate to cut the turf.

Furthermore, the bed knife 34 includes a serrated portion 46 with a plurality of teeth 48. The serrated portion 46 is disposed forward of the cutting area 40 relative to the cutting direction C. In other words, the teeth 48 extend forward from the cutting portion 38 at a length, l. Furthermore, the teeth 48 can be of any suitable shape, such as a triangular shape. In addition, the teeth 48 are disposed in spaced relationship to each other so as to define a spacing, s, between the teeth 48.

Moreover, the serrated portion 46 of the bed knife 34 is disposed below the cutting area 40 relative to a vertical direction Y represented in FIG. 3. In other words, a top surface 50 of the serrated portion 46 is separated at a distance, d, below the cutting edge 44 of the cutting area 40. Additionally, the teeth 48 of the serrated portion 46 are disposed at a pitch angle, α', relative to the cutting surface 42 of the cutting area 40. In some embodiments, the pitch angle, α', is such that the top surface 50 of the serrated portion 46 is substantially parallel to the plane of the mounting portion 36, and a bottom surface 52 of the serrated portion 46 is substantially parallel to the plane of the cutting portion 38.

In various embodiments represented in FIG. 3, the bed knife 34 is rigidly mounted between the bed bar 31 and the backing plate 35 such that the cutting portion 38 and the serrated portion 46 are disposed forward the bed bar 31 and the backing plate 35. Moreover, in some embodiments, the bed knife 34 is mounted such that the cutting portion 38 and the serrated portion 46 are substantially parallel to the turf. In addition, in some embodiments, the bed knife 34 is mounted such that the serrated portion 46 is disposed in spaced relationship below the cutting reel 21 and such that the cutting reel 21 cooperates with the cutting surface 42 to cut the turf. The arm 33 can also include an adjustment mechanism (not shown) to vary the position of the bed knife 34 with respect to the cutting reel 21 in order to provide the desired positional relationship between the bed knife 34 and the cutting reel 21.

In some embodiments, the mounting portion 36 of the bed knife 34 removably mounts to the bed bar 31. For example, in some embodiments, the mounting portion 36 magnetically mounts to the bed bar 31. More specifically, the bed knife 34 can be of a type disclosed in U.S. Patent Application Publication No. 2007/0137161, filed Dec. 8, 2006, U.S. Patent Application Publication No. 2005/0166567, filed Mar. 31, 2005, and/or U.S. Pat. No. 6,889,491, filed Jul. 24, 2002, each of which is incorporated herein by reference in its entirety. As such, the bed knife 34 can be quickly and easily removed from the mower 10 for reconditioning of the cutting surface 42, for instance. However, it will be appreciated that the bed knife 34 could be mounted to the mower 10 in any suitable manner, such as by screws, rivets, and other fasteners as well as any other suitable attachment device.

In some embodiments, the bed bar 31 includes at least one magnet 54 (FIG. 3), and the mounting portion 36 of the bed knife 34 is made of a magnetically attractive material. For instance, in some embodiments, the bed knife 34 is made out a single piece of spring steel; however, it will be appreciated that the bed knife 34 could be made out of any suitable material(s) without departing from the scope of the present disclosure. Thus, magnetic attraction between the magnet 54 and the material of the bed knife 34 retains the bed knife 34 relative to the bed bar 31. The backing plate 35 provides additional magnetic attraction between the magnetic bed bar 31 and the bed knife 34 to prevent the bed knife 34 from disconnecting from the bed bar 31.

In addition, in some embodiments, the bed bar 31 includes a plurality of pins 60, and the mounting portion 36 of the bed knife 34 includes a corresponding number of apertures 62. Each aperture 62 receives a corresponding pin 60 so as to limit movement of the bed knife 34 relative to the bed bar 31. In some embodiments, the apertures 62 are slots, and the major axis of the aperture 62 extends along the axis A. It will be appreciated that the bed knife 34 could include the pins 60, and the bed bar 31 could include the apertures 62 for limiting relative movement between the bed knife 34 and the bed bar 31 without departing from the scope of the present disclosure.

In operation, as the mower 10 moves in the cutting direction C, the teeth 48 of the serrated portion 46 of the bed knife 34 comb the turf so as to agitate and support the turf before being cut between the cutting reel 21 and the cutting surface 42 of the bed knife. Specifically, in some embodiments, grass is lifted and supported between the teeth 48 as the grass is cut. The teeth 48 can be designed to move under the grass canopy thereby lifting the grass and supporting it from the sides as the grass moves closer to the cutting edge 44 of the bed knife 34. This leads to a superior cut performance and cut quality in terms of effective height of cut and consistency of cut, which ultimately leads to a healthier turf.

In some embodiments, the bed knife 34 can be adapted according to the material to be cut by the mower 10 in any suitable manner. For example, the serrated portion 46 can be adapted by adapting the distance, s, between the teeth 48, adapting the length, l, between the teeth 48, adapting the pitch, α', of the teeth 48, adapting the shape of the teeth 48, and/or adapting the thickness, t, of the cutting area 40.

For instance, if the mower 10 is used to cut thick grass, a bed knife 34 can be attached to the mower 10 having relatively wide spacing, s, between the teeth 48 to enable the thicker grass to enter between and be supported by the teeth 48. Also, a bed knife 34 with a relatively large thickness t can be used to cut thick, tall, dense grass such that the cutting portion 38 is more robust and can withstand the more intense cutting operation. Additionally, the bed knife 34 can be adapted for dressing operations, in which sand is sprinkled on a green, and the serrated portion 46 is run over the green to agitate the grass, causing the sand fall from the leaf of the grass to the ground. Moreover, the bed knife 34 can be adapted to enable a scalp-down operation, in which the grass is cut down to a length substantially even with the ground. In this scalp-down operation, the serrated portion 46 and/or the position of the bed bar 31 relative to the cutting reel 21 can be adapted such that the cutting point of the grass is the terminal forward end of each tooth 48.

Figure 4:
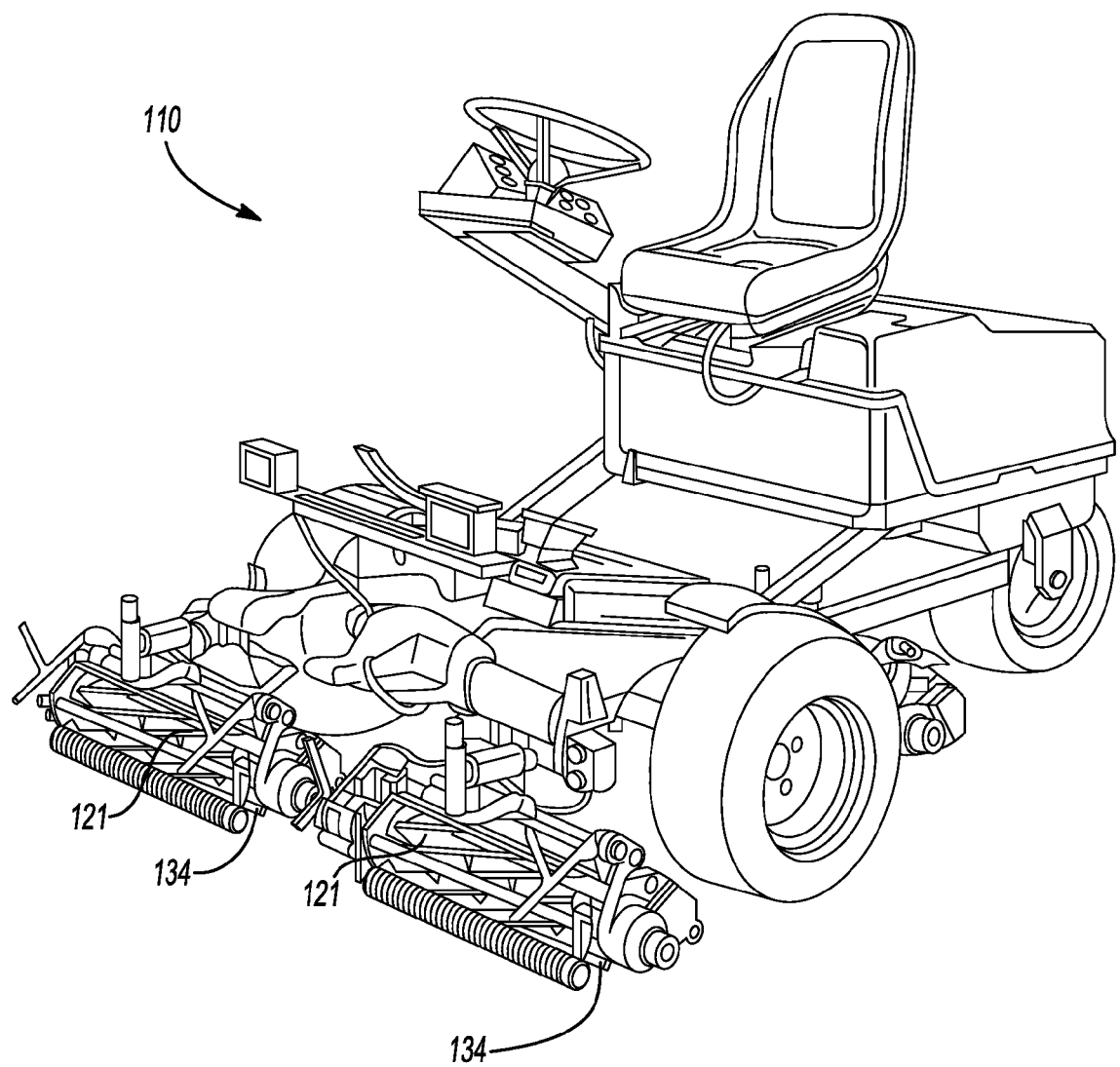
FIG. 4 is a perspective view of another embodiment of a mower according to various embodiments of the present disclosure.

Referring now to FIG. 4, another embodiment of the mower 110 is illustrated. In the embodiment shown, the mower 110 is a riding mower that includes a plurality of cutting reels 121. The mower 110 also includes a plurality of bed knives 134. Each cutting reel 121 has an associated bed knife 134 mounted adjacent thereto. The bed knives 134 of the mower 110 are serrated so as to be substantially similar to the bed knife 34 discussed above in relation to FIGS. 1-3.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A bed knife for a mower that includes a cutting implement for cutting a material, the bed knife comprising:
   a mounting portion that mounts to the mower;
   a cutting area defining a front surface, an upper surface, and a cutting edge at the intersection of the front surface and upper surface, said upper surface having a cutting surface at which the cutting implement cooperates with the bed knife to cut the material; and
   a serrated portion of the bed knife extending from said front surface, said serrated portion spaced apart from, below, and in front of the cutting surface relative to a cutting direction, the serrated portion including a plurality of teeth, the teeth of the serrated portion of the bed knife are below the cutting edge and cutting surface so that the teeth comb turf so as to support the turf prior to being cut at the cutting surface.

2. The bed knife of claim 1, wherein the cutting area includes a cutting edge, and wherein a top surface of the serrated portion is separated at a distance from the cutting edge of the cutting area.

3. The bed knife of claim 1, wherein the mounting portion defines a plane, wherein the cutting surface of the cutting area is substantially planar and disposed at a positive angle relative to the mounting portion.

4. The bed knife of claim 1, wherein the mounting portion includes a magnetically attractive material.

5. A mower for cutting a material comprising:
   a cutting implement;
   a mounting member;
   a bed knife including a mounting portion that mounts to the mounting member, a cutting area defining a front surface, an upper surface, and a cutting edge at the intersection of the front surface and upper surface at which the cutting implement cooperates with the bed knife to cut the material, and a serrated portion of the bed knife including a plurality of teeth extending from said front surface, the serrated portion is below the cutting area such that the cutting area is between the teeth and the cutting implement, the teeth of the serrated portion of the bed knife are below the cutting edge and cutting surface so that the teeth comb turf so as to support the turf prior to being cut by the cutting implement.

6. The mower of claim 5, wherein the cutting implement is a cutting reel that rotates relative to the bed knife and that cuts the material against the cutting area of the bed knife.

7. The mower of claim 5, wherein the mounting portion removably mounts to the mounting member.

8. The mower of claim 7, wherein the mounting portion magnetically mounts to the mounting member.

9. The mower of claim 8, wherein the mounting member includes a magnet that magnetically attracts the mounting portion of the bed knife to magnetically mount the bed knife to the mounting member.

10. The mower of claim 5, wherein the mower is configured to move in a cutting direction to cut the material, and wherein the serrated portion is disposed forward of the cutting area relative to the cutting direction.

11. The mower of claim 5, wherein at least one of the mounting member and the mounting portion of the bed knife includes a pin and the other of the mounting member and the mounting portion includes an aperture that receives the pin to limit movement of the bed knife relative to the mounting member.

12. The mower of claim 5 wherein the mounting portion defines a plane, wherein a cutting surface of the cutting area is substantially planar and disposed at a positive angle relative to the mounting portion, wherein the cutting area includes a cutting edge, and wherein a top surface of the serrated portion is separated at a distance from the cutting edge of the cutting area.

13. A walking mower for cutting a material comprising:
   a cutting implement;
   a mounting member;
   a bed knife including a mounting portion that mounts to the mounting member, a cutting area defining a front surface, an upper surface, and a cutting edge at the intersection of the front surface and upper surface at which the cutting implement cooperates with the bed knife to cut the material, the cutting area extends from the mounting portion at an angle, and a serrated portion of the bed knife including a plurality of teeth extending from said front surface and are below the cutting edge and cutting surface so that the teeth that comb turf to support the turf prior to being cut by the cutting implement.

14. A riding mower for cutting turf comprising:
   a cutting implement;
   a mounting member;
   a bed knife including a mounting portion that mounts to the mounting member, a cutting area defining a front surface, an upper surface, and a cutting edge at the intersection of the front surface and upper surface at which the cutting implement cooperates with the bed knife to cut the turf, and a serrated portion including a plurality of teeth extending from said front surface, the serrated portion is vertically spaced apart from the cutting area such that the cutting area is between the cutting implement and the serrated portion of the bed knife including a plurality of teeth that are below the cutting edge and cutting surface so that the teeth comb turf to support the turf prior to being cut by the cutting implement.

15. A method of configuring a mower with a cutting implement that cuts a material comprising:
   adapting a bed knife for cutting the material, the bed knife including a mounting portion that mounts to a mounting member of the mower, a cutting area defining a front surface, an upper surface, and a cutting edge at the intersection of the front surface and upper surface at which the cutting implement cooperates with the bed knife to cut the material, and a serrated portion of the bed knife extending from said front surface, said serrated portion spaced apart from, below, and in front of the cutting area and includes a plurality of teeth that are below the cutting edge and cutting surface so that the teeth comb turf so as to support the turf prior to cutting the turf at the cutting area by the cutting implement; and mounting the bed knife to the mower.

16. The method of claim 15, further comprising adapting the bed knife according to the material to be cut by the cutting implement.

17. The method of claim 16, wherein adapting the bed knife comprises adapting at least one of a distance between the teeth, a length of the teeth, a pitch of the teeth, shape of the teeth, and a thickness of the cutting area.

18. The method of claim 15, further comprising magnetically mounting the bed knife to the mower.

* * * * *